(12) United States Patent
Hacker et al.

(10) Patent No.: US 12,544,267 B2
(45) Date of Patent: *Feb. 10, 2026

(54) ARRANGEMENT FOR LASER VITREOLYSIS

(71) Applicant: Carl Zeiss Meditec AG, Jena (DE)

(72) Inventors: Martin Hacker, Jena (DE); Manfred Dick, Gefell (DE)

(73) Assignee: Carl Zeiss Meditec AG, Jena (DE)

( * ) Notice: Subject to any disclaimer, the term of this patent is extended or adjusted under 35 U.S.C. 154(b) by 860 days.

This patent is subject to a terminal disclaimer.

(21) Appl. No.: 17/766,650

(22) PCT Filed: Sep. 8, 2020

(86) PCT No.: PCT/EP2020/075072
§ 371 (c)(1),
(2) Date: Apr. 5, 2022

(87) PCT Pub. No.: WO2021/069168
PCT Pub. Date: Apr. 15, 2021

(65) Prior Publication Data
US 2024/0139033 A1 May 2, 2024

(30) Foreign Application Priority Data
Oct. 9, 2019 (DE) ...................... 10 2019 007 147.6

(51) Int. Cl.
*A61F 9/008* (2006.01)
(52) U.S. Cl.
CPC .. *A61F 9/0084* (2013.01); *A61F 2009/00874* (2013.01); *A61F 2009/00878* (2013.01); *A61F 2009/00897* (2013.01)
(58) Field of Classification Search
None
See application file for complete search history.

(56) References Cited

U.S. PATENT DOCUMENTS 5,459,570 A * 10/1995 Swanson ............... A61B 5/6852
356/479
8,736,935 B2 * 5/2014 Antkowiak ............ A61B 3/102
359/200.7
(Continued)

FOREIGN PATENT DOCUMENTS

DE 10 2008 063 225 A1 7/2010
DE 10 2011 103 181 A1 12/2011
(Continued)

OTHER PUBLICATIONS

Buckhurst et al., A new optical low coherence reflectometry device for ocular biometry in cataract patients, Br J Ophthalmol 2009 (Year: 2009).*

(Continued)

*Primary Examiner* — Carl H Layno
*Assistant Examiner* — Manolis Pahakis
(74) *Attorney, Agent, or Firm* — DeWitt LLP

(57) ABSTRACT

An arrangement for laser treatment of vitreous floaters. The arrangement for laser vitreolysis of an eye includes an OCDR system, a laser system having a deflection unit, optical elements that couple the OCDR system and the laser system, a display unit and a central control and operating unit. The OCDR system is configured to localize the position of a floater along the optical axis of the OCDR system. The laser system is configured to destroy the floaters by application of laser pulses, and the central control and operating unit is configured to focus the laser system onto the position of the floater and to activate it, in particular when the position of the laser focus and the floater match in a sufficient manner. The present invention relates to an arrangement for the gentle, low risk and painless laser treatment of vitreous floaters, which allows a partially or fully automated therapy.

14 Claims, 2 Drawing Sheets

(56) References Cited

U.S. PATENT DOCUMENTS

| | | | |
|---|---|---|---|
| 9,463,115 B2* | 10/2016 | Dick | A61F 9/00836 |
| 2006/0195076 A1 | 8/2006 | Blumenkranz et al. | |
| 2007/0291277 A1* | 12/2007 | Everett | G01B 9/02077 |
| | | | 356/497 |
| 2010/0284021 A1* | 11/2010 | Hacker | G01B 9/02028 |
| | | | 356/497 |
| 2010/0302550 A1* | 12/2010 | Hacker | A61B 3/102 |
| | | | 356/479 |
| 2013/0242259 A1* | 9/2013 | Hacker | A61B 3/102 |
| | | | 351/246 |
| 2013/0308097 A1* | 11/2013 | Ebersbach | G01B 9/02004 |
| | | | 351/206 |
| 2014/0257257 A1 | 9/2014 | Grant et al. | |
| 2015/0342782 A1 | 12/2015 | Mordaunt et al. | |
| 2017/0326003 A1* | 11/2017 | Schuele | A61F 9/00825 |
| 2018/0028354 A1 | 2/2018 | Heeren | |
| 2019/0105200 A1* | 4/2019 | Hipsley | A61F 9/00838 |
| 2020/0038241 A1 | 2/2020 | Wang | A61F 9/009 |
| 2023/0000341 A1* | 1/2023 | Robledo | A61B 3/10 |
| 2024/0108506 A1* | 4/2024 | Hacker | A61F 9/009 |

FOREIGN PATENT DOCUMENTS

| | | |
|---|---|---|
| DE | 10 2017 210 779 A1 | 12/2018 |
| WO | WO 2009/036104 A2 | 3/2009 |
| WO | WO 2020/0026153 A1 | 2/2020 |

OTHER PUBLICATIONS

Drexler et al., Partial Coherence Interferometry: A Novel Approach to Biometry in Cataract Surgery, Am. J. of Opthalmology, Oct. 1998 (Year: 1998).*
Papacosta P., The Confirmation of the Inverse Square Law Using Diffraction Gratings, The Physics Teacher, Mar. 2014 (Year: 2014).*
International Search Report for PCT/EP2020/075072, mailed Dec. 7, 2020, 6 pages.
English translation of International Search Report for PCT/EP2020/075072, mailed Dec. 7, 2020, 3 pages.
Brasse, K., Schmitz-Valckenberg, S., Jünemann, A et al. Ophthalmologe (2019) 116: 73. https://doi.org/10.1007/s00347-018-0782-1).
Ellex (product brochure by Ellex Medical Pty Ltd.; "Tango Reflex—Laser Floater Treatment"; PB0025B; 2018; (http://www.ellex.com)).
Leydolt et al., "Effects of change in intraocular pressure on axial eye length and lens position", Eye (2008) 22, 657-661).
Leonardi et al.; First Steps 10 toward Noninvasive Intraocular Pressure Monitoring with a Sensing Contact Lens. Invest. Ophthalmol. Vis. Sci. 2004;45(9):3113-3117. doi: 10. 1167/iovs.04-0015.

* cited by examiner

ARRANGEMENT FOR LASER VITREOLYSIS

RELATED APPLICATIONS

This application is a National Phase entry of PCT Application No. PCT/EP2020/075072 filed Sep. 8, 2020, which application claims the benefit of priority to DE Application No. 10 2019 007 147.6, filed Oct. 9, 2019 the entire disclosures of which are incorporated herein by reference.

TECHNICAL FIELD

The present invention relates to an arrangement for treating vitreous opacification by laser.

BACKGROUND

The vitreous humor consists of a usually clear, gel-like substance in the interior of the eye between the lens and the retina. In youth, the vitreous humor is completely clear and has contact with the retina. Over the course of a lifetime, the vitreous humor liquefies and increasingly detaches from the retina; this is referred to as posterior vitreous detachment. This is a normal aging process which usually occurs after the age of 50. The detached vitreous humor components come together in the interior of the eye and the framework substances, which are liquefying at different rates, and concentrations of the vitreous humor are rendered visible to the patients. Since they may also move across the visual field as a consequence of eye movements they are also referred to as floaters. Often, as a cause of floaters, membrane-like structures are also present on the posterior side of the vitreous humor following the vitreous humor detachment, sometimes even the remains of blood should retinal injury have occurred during the vitreous humor detachment. In rare cases, floaters may also be present as crystal-like precipitates in the vitreous humor in the case of metabolic problems.

Even if floaters usually do not have a pathological cause, they are not as harmless as generally assumed because they can impair, sometimes significantly impair, the quality of life and also work productivity of the affected parties.

This opacification is perceived especially against a bright background, for example when working on a computer, when reading or when looking at the blue sky or snow, and disturb the visual faculty. Floaters that are flung into and out of the central field of vision as a result of the reading movements when reading can be particularly bothersome.

Since these often have the perceived form of "flying gnats", they are described using the technical term "mouches volantes"-which comes from the French. However, the opacification may also have different shapes, for example be branch-, ring- or star-shaped, or else be present as point clouds. In the following text, the term "floater" is used for the vitreous humor opacification to be treated, irrespective of its type or form.

In general, floaters do not disappear without treatment because the immune system does not recognize these as abnormal and therefore does not destroy these. However the affected parties can hardly ignore or overlook them. Certain floater types, such as those caused by residual blood following retinal bleeding, are partly resorbed by the body again, even if this takes weeks or months.

In what is known as vitrectomy, the vitreous humor is partly (core vitrectomy) or completely comminuted, aspirated and removed after the eye has been opened up using cutting tools. Such an intervention is carried out routinely in the case of retinal detachments or the peeling of epiretinal membranes, but is usually considered a disproportionate therapy for removing the localized vitreous humor opacification. Moreover, vitrectomy is invasive, requires a stay at a clinic and harbors the risks linked to surgical interventions, in particular the frequent inducement of a cataract, seldom a retinal detachment and very seldom, but possible, endophthalmitis.

So-called laser vitreolysis now offers a low-risk treatment alternative. Laser vitreolysis is a sparing, low-risk and pain-free laser treatment, by use of which the vitreous humor opacification can be atomized or vaporized without opening up the eye.

In the case of laser vitreolysis, short laser light pulses are directed at the vitreous humor opacification in order to obtain optical breakdown or photodisruption there on account of the high laser intensity in the focal region. The floaters and the vitreous humor surrounding these absorb the laser energy and a cutting and/or expanding laser plasma is formed, as a result of which the floaters are vaporized and/or comminuted and can as a result dissolve better or at least be removed from the central visual field. The treatment causes little pain and is without risk of infection. Laser vitreolysis provides a safe method for the sparing treatment of bothersome vitreous humor opacification should it be possible to ensure that important and sensitive eye structures, for example the capsular bag, the crystalline lens or retinal regions, especially the macula, are not damaged by the laser.

However, the success of the treatment depends on the type of floater. The treatment is particularly successful in the case of so-cold white rings or floaters which form by vitreous humor detachment around the optic nerve head but which can also disruptively move into the central visual field. Tissue strands can be severed and the tissue concentrations responsible for the disturbing shadows can be eradicated or removed from the visual region.

For more than the last three decades (Brasse, K., Schmitz-Valckenberg, S., Jünemann, A. et al. Ophthalmologe (2019) 116: 73.doi.org/10.1007/s00347-018-0782-1) floaters have been treated by YAG lasers (for example, Nd:YAG at 1064 nm), this laser treatment being significantly less widespread than the known laser post-cataract treatment for removing cell growth on the IOL back side or else retinal treatments for the local coagulation of retinal locations by application of frequency-doubled YAG lasers (532 nm), for example in the case of diabetic retinopathy or else for fastening and securing detaching retinal regions or the securing repositioning of retinal holes (foramina). In addition to green laser versions, red and yellow ones can also be used for retinal treatments (VISULAS Trion), depending on the desired penetration depth into the retina (green for a treatment near the surface; yellow and red for deeper or pigmented retinal layers, IR for the choroid). The less widespread use of laser vitreolysis can primarily be ascribed to uncertainty in respect of possible retinal, lens or capsular bag damage by the treatment laser, and the quite time-consuming manual treatment itself. As a result, laser vitreolysis has previously predominantly been carried out by quite experienced ophthalmologists specialized in this respect.

Examples of laser systems used for laser vitreolysis include the MERIDIAN Microruptor II, the Laserex LQP4106 laser and the Ellex Ultra-Q-Reflex.

According to the known prior art, there are already numerous solutions for carrying out laser surgery on the tissue of the eye, especially in the vitreous humor.

Thus, DE 10 2011 103 181 A1 describes an apparatus and a method for femtosecond laser surgery on tissue, especially in the vitreous humor of the eye. The apparatus consists of an ultra short pulse laser with pulse lengths ranging from approximately 10 fs-1 ps, in particular of the order of 300 fs, pulse energies ranging from approximately 5 nJ-5 µJ, in particular approximately 1-2 µJ, and pulse repetition rates of approximately 10 kHz-10 MHZ, in particular 500 kHz. The laser system is coupled to a scanning system which facilitates the spatial variation in the focal position in three dimensions. In addition to this therapeutic laser scanner optics system, the apparatus furthermore consists of a navigation system coupled therewith.

US 2006/195076 A1 describes a system and method for producing incisions in ocular tissue at various depths. The system and the method focus light, possibly in a pattern, on different foci situated at different depths within the ocular tissue. A plurality of foci can be created simultaneously by way of a segmented lens. Optimal incisions can be obtained by virtue of the light being focused at different depths, either successively or simultaneously, and an extended plasma column and a beam with a lengthened waist being generated. The techniques described in this case can also be used, inter alia, to perform novel ophthalmological methods or to improve existing methods, including dissection of tissue in the posterior pole, for example floaters, membranes and the retina.

US 2014/257257 A1 also describes a system and its method for treating target tissue in the vitreous humor of an eye, comprising a laser unit for producing a laser beam and a detector for producing an image of the target tissue. The system also contains a computer which defines a focal spot path for emulsifying the target tissue. A comparator connected to the computer then controls the laser unit in order to move the focus of the laser beam. This focus movement is carried out to treat the target tissue while deviations of the focus from the defined focus path are minimized.

US 2015/342782 A1 likewise relates to a system and method for using a computer-controlled laser system, for carrying out a partial vitrectomy of the vitreous humor in an eye. Surgically, an optical channel through the vitreous humor is defined first. Vitreous-like and suspended depositions (floaters) in the optical channel are then ablated and removed from the optical channel (e.g., aspirated) in some cases. In some cases, a clear liquid can be introduced into the optical channel in order to replace the ablated material and thereby establish an unimpeded transparency in the optical channel. In general, the present invention relates to systems and methods for ophthalmological laser operations. In particular, the present invention relates to systems and methods for using pulsed laser beams for removing what are known as floaters.

US 2018/028354 A1 likewise describes a method and a system for an ophthalmological intervention in an eye. Unwanted features are identified on the basis of an image of at least a portion of the eye.

Unwanted features in the vitreous humor cavity are considered to be instances of vitreous opacification that impair sight, for example floaters. Once the floaters have been identified and localized, they are sighted by a physician and manually "shot" with laser pulses. The laser energy evaporates at least some of the vitreous-like opacity. This procedure is repeated until the opacification of the vitreous humor has been removed. The entire procedure is repeated for each instance of opacification in the vitreous humor until the liquid of the vitreous humor is considered to be sufficiently clear.

A method described by ELLEX (product brochure by Ellex Medical Pty Ltd.; "Tango Reflex-Laser Floater Treatment"; PB0025B; 2018; (www.ellex.com)) provides for the use of a pulsed nanosecond laser (YAG) in order to decompose vitreous humor opacification or completely remove the latter by a transition into a gas. A pilot laser beam is used to sight the target area (floater), which is subsequently "shot" using one or more therapeutic laser pulses. In this case, both the pilot laser beam and the therapeutic laser pulse are manually triggered by the user. Such a manual laser treatment typically consists of two individual treatments, each having a duration of 20-60 minutes.

The use of laser energy within the scope of laser vitreolysis is non-invasive and avoids the disadvantages of surgical interventions, but is also linked to disadvantages and risks.

Thus, targeting the laser may be difficult. Since the physician observes the vitreous humor along the beam path, it may be difficult to determine the depth of the position of the retina, the depth of the opacification of the vitreous humor or other relevant features. As a consequence, there is the risk of the opacification of the vitreous humor being missed and/or the eye being injured.

In particular, the treatment of largely transparent floaters, which change in position and are difficult to recognize but nevertheless, as phase objects, are able to generate bothersome shadows on the retina, was found to be difficult.

The application of laser energy may also lead to an additional movement of the opacification of the vitreous humor, making the treatment even more difficult. Consequently, the physician realigns the laser after each application of laser energy. This may require much time. Therefore, a treatment with laser energy is complicated and causes stress, both for the patient and for the physician.

A further possible problem relates to incomplete vitreous humor detachment, which may lead to local vitreous traction right up to retinal detachment. Laser treatment in the vitreous humor can lead to changes in the balance of forces in the vitreous humor due to shockwaves propagating as a consequence of said treatment, and thereby for example cause tension on the retina.

Lastly, the treatment of those floaters situated in the vicinity of sensitive structures of the eye was also found to be particularly difficult. In this case, the laser radiation can lead to damage in the retina (in particular the macula), the crystalline lens or the capsular bag. Sensitive regions may likewise be the surroundings of the vitreous tractions, that is to say regions where a not fully detached vitreous humor tugs the retina, which in the case of mechanical load harbors the risk of a retinal detachment. By way of example, in the OCT such zones are identifiable by way of local, pointed lifts in the retinal layers.

SUMMARY OF THE INVENTION

Example embodiments of the present invention for example enables the OCT-assisted laser treatment of vitreous humor opacification, which rectifies the disadvantages of the known technical solutions. The solution should facilitate a simpler, quicker and especially safer treatment of bothersome vitreous humor opacification by way of laser vitreolysis. Moreover, the solution should be easy to implement and economically cost-effective and should ideally require only little readjustment from current laser treatments.

Using the proposed laser vitreolysis arrangement, consisting of an OCDR system, a laser system with a focusing unit, optical elements for coupling the OCDR and laser system, a display unit and a central control and operating unit, benefits are achieved by virtue of the OCDR system being designed to locate the relative position of a floater along the optical axis of the OCDR system, the laser system being designed to destroy the floaters by application of laser pulses, and the central control and operating unit being designed to focus the laser system on the relative position of the floater and activate said laser system, in particular when relative positions of the laser focus and floater correspond sufficiently.

In this case, the term OCDR (=optical coherence domain reflectometry) refers to the totality of methods for determining the relative position or the spacing of scattering structures in the eye by way of interferometry.

In this case, particular preference is given to the OFDR (optical frequency domain reflectometry) method, especially the so-called swept-source OFDR methods as described in DE 102008063225.2, the entire content of which is referred to herewith. Embodiments as spectrometer-based SD-OCDR or as a TD-OCDR are possible but not preferable.

In this case, it is particularly advantageous, for example, if the laser beam and the measuring beam of the OCDR system are overlaid collinearly, have the same or virtually the same wavelength, and are focused the same or virtually the same. When using other wavelengths of the OCDR system, for example approximately 780-840 nm or else 1320 nm, in comparison to the YAG laser wavelength of 1064 nm, a calibration of the measurement signals of the OCDR system in relation to the focal position of the YAG laser is required and envisaged, in particular in relation to the relative position of the retina and posterior capsular bag membrane. This calibration can be carried out in advance using an artificial test eye.

For example, the OCDR system operates at a wavelength of 1060 nm and, at a frequency of at least 100 Hz, better 1-10 kHz, is able to produce A-scans of at least the entire eye length (ideally up to 30 of the 40 mm in tissue) and with an axial measurement resolution in the tissue of for example 20 μm, better 10 μm or 5 μm.

Further for example, the system is configured to evaluate such an A-scan at approximately the same frequency and determine the relative position of eye structures (cornea, lens, retina) and possible floaters with a low latency of the order of a few milliseconds (<100 ms, ideally <20 ms, <10 ms or even <5 ms) and to trigger the laser when safety criteria are satisfied. By way of example, these safety criteria can be minimum distances from sensitive eye structures. These distances may depend on the type of eye structure, for example be greater for the sensitive macula than for less sensitive or less critical peripheral retinal regions. In particular, minimum distances should be designed such that cutting, vaporizing or atomizing plasma effects, acoustic shockwaves and thermal tissue coagulation do not alter the tissue, or only alter this to an acceptable extent. For a 1064 nm YAG laser, exemplary minimum distances of the laser focus can be approximately 2-3 mm from the macula, and 1.5-2 mm from the capsular bag and peripheral retinal regions. This procedure also renders it possible to temporarily move floaters from the sensitive regions (anterior to the macula) to for example the region anterior to the temporal retinal periphery by way of eye movements and to atomize said floaters there by application of the fast laser vitreolysis according to the invention.

In this case, the minimum distances may also be rendered dependent on the pulse energy used, the pulse number (burst), the pigmentation state of the retina, the state of the lens (natural lens or IOL) or else on an adjustable focal length.

In particular, it is also possible for the physician themselves to define exclusion and processing zones, for example by way of cursor lines in an OCDR representation, by use of a manual definition, for example on the basis of experience.

Furthermore, according to the invention, a focusing unit is provided, the latter being able to set the laser focus on a detected floater or being able to sweep over the floater with the laser focus. This focusing can be implemented quickly (for example, in scanning or else tracking fashion), that is to say within a few 10 ms to 100 ms, or even else manually and slowly as a result of the solution according to the invention, and high precision when processing the floater with the laser can be maintained at the same time.

According to a further configuration, the central control and operating unit is designed to automatically trigger within a time period of <50 ms, better <20 ms, for example <10 ms, in a further example <5 s, taking account of the derived exclusion criteria for the treatment.

Example configurations relate to the central control and operating unit which is designed, in particular, to also determine the distance of the localized floaters from structures of the eye in addition to the relative position of said floaters and to derive exclusion criteria for the treatment.

For example, the central control and operating unit is able to determine changes in the structure of the eye closest to the located floater during the treatment and to derive abort criteria for the treatment. An exemplary abort criterion can be the detection of an onset of retinal bleeding, which is represented in the A-scan as a new, significantly scattering but also absorbing structure ("shadow" suddenly damps OCDR signal of posterior structures) in front of the retina or else increased retinal detachment during the treatment in the case of vitreous traction, or else an axial length increase (cornea to retina) as a consequence of an increasing intraocular pressure.

The present invention relates to an arrangement provided for sparing, low-risk and pain-free laser treatment of vitreous humor opacification. A partly or fully automated therapy device (system) is proposed, in which an OCDR system is used for navigation and therapy control in order to locate floaters within the scope of the treatment and to assist the treatment by virtue of at least one laser pulse being triggered substantially automatically if a floater is detected by application of OCDR should the laser be sufficiently well focused on the floater. In this case, this focusing can be implemented by focus tracking (iterative reduction in the axial distance between relative focal position and relative floater position, that is to say "tracking") or else by a periodic focal scan that sweeps over the relative floater position, or else by manually focusing on the floater. Sufficiently good focusing of the laser on the floater is understood to mean that there is not a perceivably poorer floater treatment (atomization and/or vaporization) in the case of this deviation, which generally is the case should the relative position deviation be smaller than the laser focus dimension in this direction, in particular if the deviation is less than 75%, <50%, <25% or <10% of the laser focus dimension.

The invention also relates to a method for controlling a laser for vitreolysis, wherein floaters are detected in the vitreous humor of the eye by application of OCDR and, should a floater be detected, the laser is focused on the floater and at least one laser pulse is emitted toward the floater.

In an alternative method for controlling a laser for vitreolysis, the laser focus is guided through the vitreous humor of the eye and, at the same time, OCDR is used to detect whether floaters are situated at time-dependent laser focus positions and, should a floater be detected at such a position, at least one laser pulse is triggered once the laser focus has reached the floater position.

Previous solutions have provided for a (more or less) complete image of the vitreous humor to be obtained, the floaters to be located by the physician (ELLEX Tango Reflex) or else in automated fashion, and for the treatment laser to subsequently be aligned at this location and the laser radiation to be triggered. As a result of the human reaction time or else the time required for an automated laser alignment, but also as a result of the time required for recording the image and automatically locating the floaters, it is however not ensured that when the laser is triggered, the floater still is at the suspected position and hence within the focus of the laser. In the case of a typical eye movement of 1 mm/s, a floater can already move about 20 µm within 20 ms and hence move out of a laser focus of for example 10 µm. Moreover, devices for tracking eye movements (eye trackers) often fail in this case since the floaters (living up to their name) usually move in relation to the eye structures ("landmarks" such as iris, retinal structures such as optic nerve head, macula or vessels).

For example, the system also has electromechanical (galvano-scanners), electro-optical (acousto-optic modulators) or motor driven (lens displacement) deflection units for automated beam deflection (scanning) in up to three dimensions.

When the laser system is focused, a programmed focal displacement between target position and located floater is for example taken into account.

To also exploit the acoustic shockwave produced by the laser beam, an anterior position in relation to the floater is preferred and set in the user settings of the central control and operating unit.

The distances between located floater and structures of the eye, determined by the central control and operating unit, serve to derive exclusion criteria for the laser processing, namely should the distance between the located floater and the retina, fovea, lens or the like be too small so that the laser treatment may have bleeding, retinal lesions or even a retinal detachment as a consequence.

Furthermore, processing and exclusion zones can be determined from the coordinates of the located floaters.

Firstly, these serve to realize an automated optimization of the positioning of the processing laser focus. Secondly, processing is only permitted if the processing laser focus is situated outside of the exclusion zone or within the processing zone.

While a distance >1.5 mm is sufficient as an exclusion zone in respect of the optical and acoustic wave load to be expected, a distance of >2-3 mm should be applied for sensitive areas of the eye.

The user can be warned (acoustically and/or optically) when the processing laser focus approaches the exclusion zone. Additionally, it is possible to recognize the approach of sensitive structures and to display or acoustically report this. However, it is also possible to abort the laser processing or deactivate the laser for as long as the laser is situated in the exclusion region.

There are different forms of vitreous humor opacification, which can also be treated to different degrees of success.

So-called Weiss-ring floaters are relatively large, fibrous ring-shaped floaters which are usually situated at a safe distance from the lens and the retina of the eye. As a result, these floaters can be treated safely and effectively by laser vitreolysis.

Floaters in the form of fibrous strands frequently occur in relatively young people and are perceived as a collection of points or thread-like fibers. Depending on the size and positions, these floaters can also be treated by laser vitreolysis.

By contrast, diffuse (cloud-like) floaters are the consequence of natural aging. Although this type of floater can also be treated by laser vitreolysis, a number of treatments are often required for a satisfactory result.

In accordance with an example configuration, the central control and operating unit is additionally designed to determine the type of located floater (e.g., Weiss-ring or blood remains) prior to a laser treatment and to derive treatment criteria, for example a suitable laser energy, a suitable laser wavelength or a suitable laser pulse number. The type of floater can be determined by way of OCDR signal strength (i.e., back-scatter capability), absorption (for example by determining a more significant reduction of the signals from posterior structures behind a blood clot), the size (in particular the axial extent), the position (for example proximity to the optic nerve head), mobility or else the reaction to laser treatment.

In accordance with an example configuration, the central control and operating unit is additionally designed to determine changes or positional variations in the structure of the eye closest to the located floater during the treatment and to derive abort criteria for the treatment. By way of example, the closest structure can be the capsular bag or else the vitreoretinal interface.

According to the invention, a decision to abort or continue is derived during the treatment. Example criteria in this respect are:
  exceeding a limit of a change in relative position within the retinal layers (e.g., local shift of a retinal region in the anterior direction) or
  exceeding a threshold for the change in the intraocular pressure as a result of the laser effect
  the onset of bleeding during the treatment as an abort criterion.

For example, the positions of the floaters in relation to the sensitive structures of the eye are automatically detected from the OCDR results. To this end, the distance between the posterior capsular bag and retinal structures is determined by application of the OCDR system and is used to make a respective decision in respect of which is the closest sensitive structure that should be tracked by application of OCDR.

Should the treatment be continued, OCDR is used to track over the course of the treatment whether the treatment can be continued or has to be aborted.

In particular, deriving an abort criterion should prevent the mechanical balance of forces at the vitreoretinal interface from developing disadvantageously as a result of vitreal processing and from making subsequent retinal lesions or even a retinal detachment more probable.

To prevent the located floater from moving out of the focal region of the processing laser, the processing laser is triggered according to the invention within the time duration of <10 ms following the laser focus being overlaid on a floater.

According to the invention, the optical elements for coupling OCDR and laser system are based on dichroic or polarization-sensitive optical components (for example, wavelength-sensitive splitter, polarization splitter cube or else wavelength-independent splitters, which for example steer 30% of the OCDR measurement light to the eye and 70% of the processing laser) or use a geometric combination (pupil division). In the case of the latter, small angles may also be accepted between OCDR and processing laser beam, for example if the intention is to treat floaters that are not too small and a sufficient overlap between the two beams is attained at least within the processing zone.

For example, the beam cross sections of OCDR and of laser prior to the overlay are chosen such that the numerical aperture of the OCDR beam in the eye is smaller than that of the processing laser. An advantage of this setting is that the signal strengths in the OCDR signal have a less pronounced change in the case of axial focal positions than in the case of other configurations of the numerical aperture.

It is not preferred but possible for mirrors to be introduced into the beam path very briefly in order to facilitate a very quick switchover between processing laser and OCDR beam, for example by use of a quickly rotating mirror with transmission windows.

The coupling by use of dichroic optical components is for example implemented by use of a notch filter which for example transmits a narrowband Nd:YAG processing laser and reflects the more broadband OCDR beam.

As a display unit, use can be made of eyepieces with an overlaid display, a head-mounted display and/or a separate display (visual display unit).

In accordance with a further example configuration, the OCDR system, the laser system with deflection unit, the optical elements for coupling OCDR and laser system, the display unit and the central control and operating unit are integrated in a slit lamp.

The advantage of this is that the user can observe the posterior part of the eye using the slit lamp and can locate opacification of the vitreous humor in advance, and for example detect other pathologies possibly present, which could represent an exclusion criterion for treatment (for example, a peripheral retinal detachment).

The above summary is not intended to describe each illustrated embodiment or every implementation of the subject matter hereof. The figures and the detailed description that follow more particularly exemplify various embodiments.

BRIEF DESCRIPTION OF THE DRAWINGS

The invention is described in more detail below on the basis of exemplary embodiments. In this respect.

DETAILED DESCRIPTION

Figure 1:
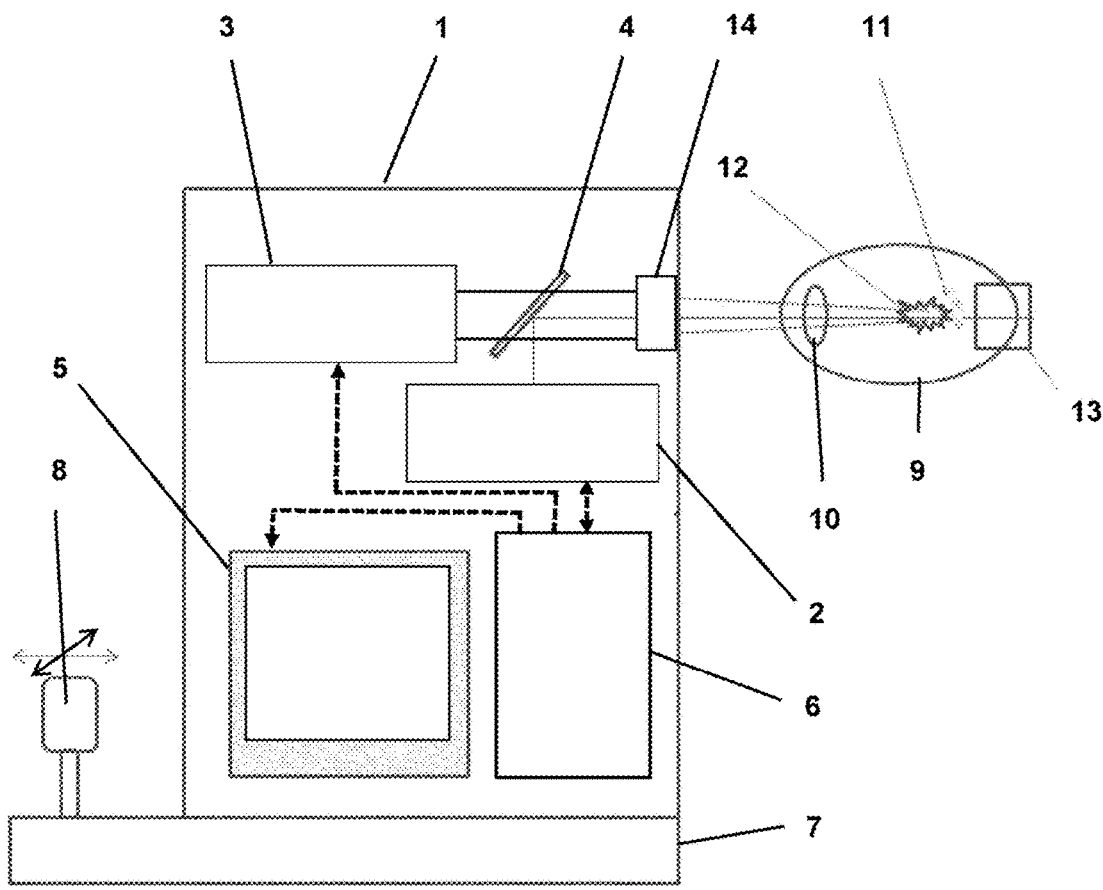
FIG. 1: shows a symbolic representation of the arrangement according to the invention for OCDR-assisted laser vitreolysis integrated in a slit lamp.

In this respect, FIG. 1 shows the symbolic representation of a slit lamp, in which the arrangement according to the invention for OCDR-assisted laser vitreolysis is integrated.

Additionally integrated into the slit lamp 1 (merely represented by a box) are the OCDR system 2, the laser system 3, the beam merger 4 (embodied here as a dichroic optical element) for coupling OCDR system and laser system, a visual display unit 5 and a central control and operating unit 6, and also a focusing unit 14 with deflection unit.

It is well known that the slit lamp 1 is arranged on a base unit 7 which can be positioned in 2 or 3 axes in relation to the eye 9 by way of a joystick 8.

In addition to the crystalline lens 10, a located floater 11 and the laser focus 12 are depicted in the eye 9. Since the retina in this case is the structure of the eye 9 closest to the located floater 11, at least this region (denoted by position number 13) is examined in more detail by application of OCDR during the treatment.

In addition to the located floater 11, application-specific irradiation patterns, exclusion criteria or abort criteria for the treatment, or else defined processing and exclusion zones, for example, could be displayed for the operator on the visual display unit 5.

Figure 2:
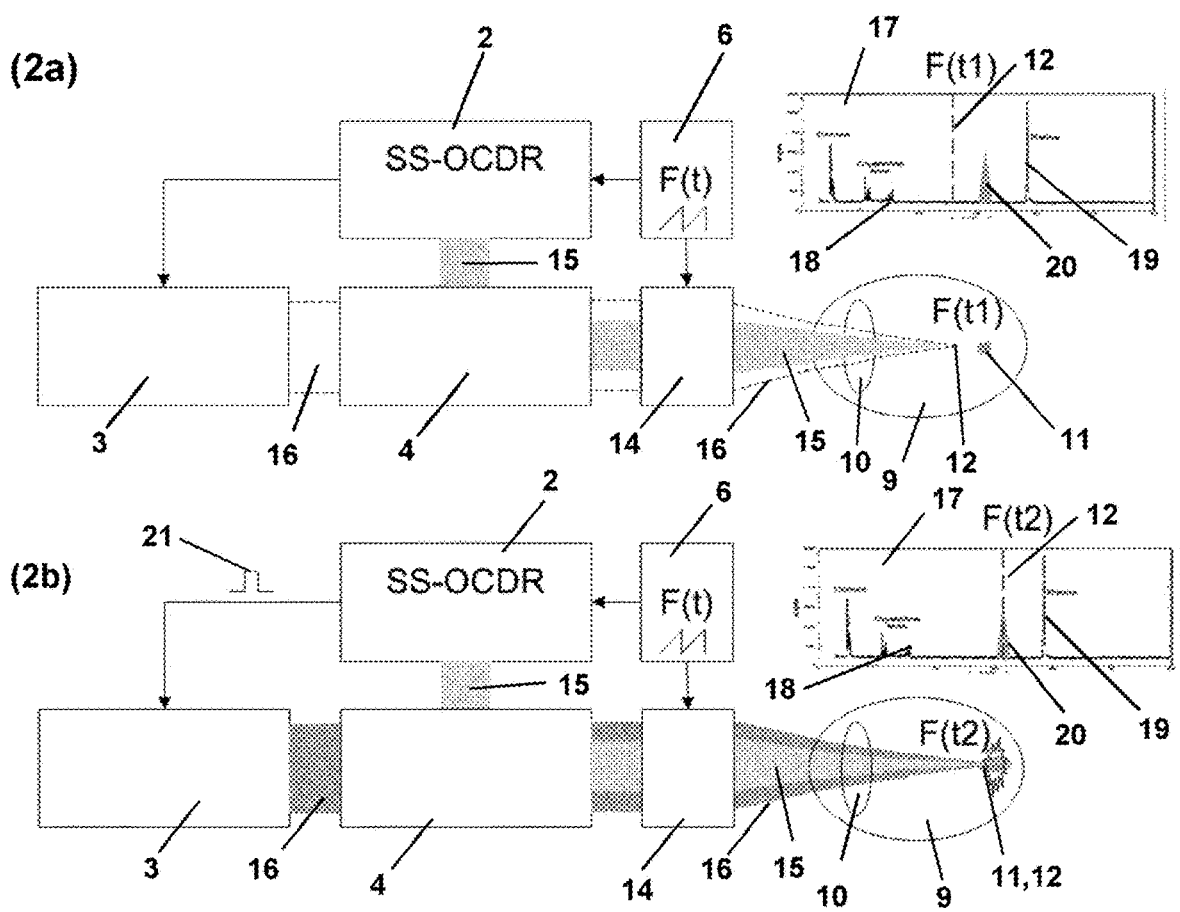
FIG. 2: shows a schematic representation of a example embodiment variant of the invention.

An example embodiment variant of the invention is explained in more detail in FIG. 2. In this case, the representation concentrates on the interaction according to the invention between laser 3 and OCDR system 2. FIG. 2a shows the conditions at the time $t_1$ without a floater 11 in the laser focus 12; in this case, F (t) represents a focal position of the laser as a function of time. The measuring beam 15 of the OCDR system 2 is brought together with the (in this case inactive) laser beam 16 of the laser 3 by use of the beam merger 4 and is directed at the eye 9. The beam cross sections upstream of the beam merging were chosen such that the numerical aperture of the OCDR signal in the eye is smaller than that of the laser. The OCDR system 2 is capable of measuring complete A-scans of the eye 9 at 100 Hz, for example 1 kHz or faster. Such an A-scan 17 is shown here in example fashion. In a manner known per se, it contains the reflections from the cornea, anterior lens side, posterior lens side 18 and retina 19. Additionally, the A-scan contains a reflection 20 from a floater 11, the relative position of which in the eye has consequently been detected. The laser focus 12 is not situated in the region of the floater 11, and so the laser is not triggered. Using the focusing system 14, the laser focus 12 is displaced into the region of the floater 11 (FIG. 2b, time $t_2$). When the relative positions of laser focus 12 and floater 11 correspond (reflection 20 and laser focus 12 substantially correspond), the laser pulse is triggered (schematically represented by control pulse 21), for example within a time <5 ms. Since the relative position of the floater 11 is in each case updated within less than 10 ms by an A-scan, it is ensured that said floater cannot move out of the laser focus 12 within this brief period of time.

In addition to mechanically displaceable lenses found on a linear slide with a position measuring system, electrically adjustable lenses such as EL-10-30-C or -Ci, in particular, which can set a target focus in less than 10-15 ms (Optotune Switzerland AG|Bernstrasse 388, CH-8953 Dietikon), are suitable for quickly focusing the laser focus 12 by use of the focusing unit 14. Alternatively, a conventional lens can be periodically axially displaced back and forth in the direction of the eye by use of a magnetically driven resonator in order to vary the focal position in the case of a fixed focal length. In this case, the lens position can also be detected by use of a linear encoder and can easily be calibrated in relation to the OCDR signal. A manual or else motor-driven movement of the entire slit lamp in the direction of the eye for the purposes of altering the focus setting is possible but not preferable.

A calibration of the relative focal position in relation to the OCDR can be achieved in different ways. One variant lies in scanning through the common focus setting of OCDR and laser focus, and detecting relative focus position-dependent signal increases of the cornea, lens, capsular bag, vitreous humor scattering or retinal structures, since the OCDR signal has its maximum when focused on the structure. Alternatively, a calibration can be achieved by way of the relative focal position to the OCDR by use of the axial position of the beam waist being determined, for example by use of a screen or beam profiler, in the case of a fixed focal setting and the relative position of the screen or the beam profiler then being determined by OCDR, optionally also in a liquid-filled test eye.

By use of this arrangement, it is possible to realize a method for treating floaters, which is characterized by the following steps:
  measuring an A-scan,
  detecting a reflection of a floater (if present) in the A-scan,
  optionally detecting posterior lens/capsular bag side and retina in the A-scan,
  optionally verifying the admissibility of the laser treatment at the location of the floater,
  optionally verifying the admissibility of the laser treatment depending on the floater signatures (floater type),
  displacing the laser focus onto the floater,
  optionally checking whether the floater still is at this location,
  triggering the laser pulse directed at the floater.

This method is particularly preferred for example if the adjustment of the laser focus can be realized in the order of milliseconds or fractions of a second, for example using an electrically adjustable lens with appropriate properties, but in principle also works in the case of slow, optionally manual focusing, even though the probability of the floater running away during the focusing increases, that is to say the treatment efficiency drops, even though the advantage from exclusion and treatment zones is maintained.

Furthermore, there can also be a lateral displacement of the laser focus by use of a deflection unit (for example, a galvano-scanner), that is to say scanning floater processing at a constant depth in the eye.

In an alternative method, the laser focus is moved along the A-scan and should a floater be detected in the region of the laser focus (by way of an evaluation of the A-scan) the laser pulse is triggered within milliseconds. Relatively slow focusing units (for example, a few Hz to several 10 Hz) would be suitable to this end.

The displacement of the A-scan relative to the eye axis for the treatment of further floaters can be implemented both by hand (by use of the joystick 8) or in a motor-driven fashion in this case. In the manual variant, the physician can sight the floater/floaters and start the treatment. Only if the OCDR system detects a floater in the A-scan and the laser focus is directed at the floater is a laser pulse triggered (without further interaction). Hence, the treatment success is no longer dependent on the skill and reaction speed of the physician.

The motor-controlled variant lends itself to initially creating an overview image of the vitreous humor by application of an OCT system in a manner known per se and approximately detecting the relative position of floaters. These relative position coordinates are then successively homed-in on, with the actual relative position of the floaters then being verified by the OCDR system and one (or more) laser pulse(s) being emitted only in the direction of actually detected floaters.

Figure 3:
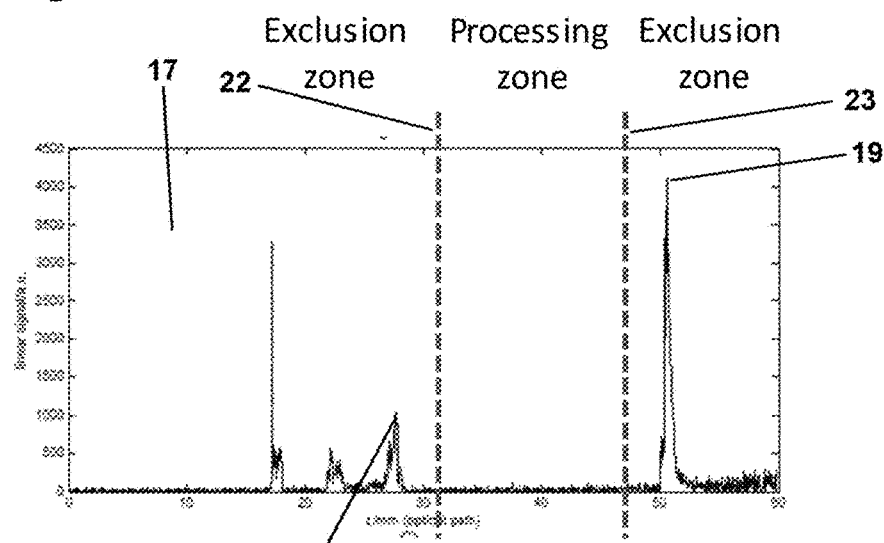
FIG. 3: shows a representation of an A-scan with exclusion zones and a processing zone.

The verification of the admissibility of the laser treatment can be effected in different ways. Initially, the laser treatment should be precluded from being implemented too close to sensitive structures of the eye such as posterior lens/capsular bag side or retina/macula. Admissible ranges can be defined (>1.5 mm from the posterior capsular bag side, <2-3 mm from the retina) by way of an appropriate evaluation of the A-scan. FIG. 3 shows a corresponding example of an A-scan with the boundaries between exclusion zones and processing zones. The anterior exclusion zone is located on the anterior side of the anterior boundary 22 of the processing region and the posterior exclusion zone is located on the posterior side of the posterior boundary 23 of the processing region. In particular, the posterior lens side 18 is sufficiently deep within the anterior exclusion zone and the retina 19 is sufficiently deep within the posterior exclusion zone so that desired minimum distances from these structures are realized by the laser processing.

A laser treatment is only admitted in the processing region enclosed by the boundaries 22, 23.

Furthermore, further parameters can be verified during the treatment, with intraocular pressure monitoring being preferred in the present case.

This can be implemented in various ways:
1. By verifying a change in the eye length along the A-scan. The corresponding data to this end are available by evaluating the A-scan; if a lengthening arises in this case, this can be used as an abort criterion (for example, an increase in eye length by 4.5 µm in order to limit a pressure increase to 2 mmHg, cf. Leydolt et al., "Effects of change in intraocular pressure on axial eye length and lens position", Eye (2008) 22, 657-661).
2. By measuring the change in the intraocular pressure by use of an appropriately equipped contact glass (this is explained in more detail below with reference to FIG. 4).
3. On the basis of ultrasound, as described in more detail in EP 3 173 013 A2, the content of which is herewith referenced.

If a difference of the intraocular pressure of for example 2 or 5 or 10 mmHg is exceeded, the further treatment is aborted in order to avoid damage to the eye. The choice of the abort criterion in respect of pressure can be rendered dependent on possible pathologies of the patient, for example there has to be more caution in respect of pressure increases in the case of glaucoma patients.

The proposed arrangement provides for the use of an OCDR system, which is based on a spectral domain method or, for example, a swept source method. The use of a time domain system with a several hundred Hz repetition rate over a restricted scan depth range of 2-3 millimeters would also be possible.

Here, according to the invention, an axial scan depth >1 mm, for example 4 mm, in tissue in the case of an axial resolution of less than 100 µm, for example 5 µm, FWHM in tissue, and a centroid wavelength of 840 nm are provided according to the invention, and an A-scan rate of 10 to 100 kHz. For example, the system comprises z-tracking of retina or capsular bag, depending on which structure of the eye is closer to the located floater. As a result of the small scanning depth, the use of a plurality of parallel reference arms is possible, and so the relevant eye structures and a posterior vitreous humor region outside of the single scanning depth can be detected together. This approach is also conceivable for a time domain system. However, the latter has deficits in relation to the sensitivity (typically 85 dB). By contrast, spectral domain systems can still have 90 dB sensitivity at repetition rates of several 10 kHz, as a result of which even normal, non-bothersome vitreous humor structures are detectable. By contrast, swept source systems in the kHz range, with over 100 or even 110 dB sensitivity, still have sensitivity reserves that even render measurements through contracts possible.

For swept source system, a centroid wavelength in the range of 1000-1070 nm, in particular 1050 nm or 1060 nm, a scan rate of 1 kHz to 100 MHz (e.g., by use of Fourier domain mode locked (FDML) lasers or VCSEL lasers) and at least 90 dB sensitivity in the processing zone are preferred. The system is combined with an Nd:YAG laser or fs laser, notch layer system filter and, in the process, covers the whole eye with its OCDR scanning depth. The axial resolution of the SS-OCDR is for example chosen in such a way that it corresponds to the Rayleigh length of the processing laser, or else is greater than two times to three times the Rayleigh length. Although a higher axial resolution is possible, it hardly permits a better floater treatment. Should axial length change be detected in order to determine pressure changes, axial resolutions below 30 µm, for example below 10 µm or even of the order of 5 µm are useful.

According to the invention, a time domain system with scanning reference arm is also applicable. Apart from the A-scan rate, the preferred parameters correspond to those of the SD-OCT. In this case, the A-scan rates lie in the order of a few kHz, for example to 2 to 4 kHz.

The respective path components in air and eye should be considered for all OCDR variants and a corresponding position determination correction and optionally a group speed dispersion correction may be necessary.

To be able to detect floaters well, the systems according to the invention have a sensitivity of 85 dB, for example at least 90 dB, in at least one part of the A-scan. In a further example variant, the A-scans have at least a sensitivity of 90 dB and further for example sensitivities of more than 100 dB over the entire scanning depth. Above approximately 90 dB, normal scattering on the vitreous humor and also on the crystalline lens becomes detectable even in regions without floaters, and thus allows the distinction of lens and vitreous humor structures from liquid-filled pockets or eye regions.

Independently of the variants just mentioned, the OCDR system can be part of an OCT system that is embodied as a two-dimensionally or else three-dimensionally scanning system; what is important is that the floater is located in relation to a changeable focus setting and the laser pulse is triggered on the basis of the evaluation of an A-scan (and not on the basis of image information).

The position of the floater in the eye (in the coordinate system of the patient's eye) can be determined by use of a one-dimensional OCDR scan (A-scan) and the distance of said floater from the retina or other interfaces can be calculated, and this can be carried out in a very timely fashion and with little effort. This therefore serves to assist navigation and increase safety in the case of a manual treatment of the floaters. As a result of the possible very high sensitivity of the OCDR over all non-interferometric imaging methods, floater detection and visualization is realizable in substantially more reliable form. The light exposure can also be significantly reduced in relation to the VIS-light-based methods by the application of interferometric methods, in particular in the NIR spectral range, this including a significant reduction in the accompanying blinding or pupil contraction if sufficient dilating was not brought about by medicaments.

Additionally, a distance display for the user is rendered possible by realizing a processing zone, which delimits the extent of permitted processing. If the treatment laser is activated within the exclusion zone, the user is warned and/or the output of therapy radiation is blocked.

According to the invention, the OCDR system has a sensitivity of 90 dB, at least in a part of the A-scan.

The proposed arrangement provides for the use of a laser system which is based on a us to ns YAG laser, a ps- or an fs-laser.

While the pulse duration of 1-5 ns is preferred for example according to the invention for a YAG laser, these durations are between 1 and 1000 ps in the case of a ps laser and between 50 and 1000 fs in the case of an fs laser.

Instead of YAG lasers such as the Nd:YAG laser at 1064 nm, 946 nm, 1320 nm wavelength, similar lasers such as for example the Nd:YLF laser at 1047 to 1053 nm and otherwise similar parameters as the YAG lasers can be considered. The use of frequency-doubled lasers is possible as a matter of principle, but the inexpediently amplified absorption by blood, in particular in vessels, needs to be considered.

According to one further example configuration, the laser system, in addition to a treatment beam, comprises at least one pilot beam for monitoring the correspondence of treatment beam focus and target area. Laser diodes in the VIS are suitable to this end, for example in the red spectral range at 635 nm.

For example, the pilot beam can be continuous or quasi-continuous. In the case where visual monitoring should be implemented by the user, it is advantageous to use a pilot beam in the visible spectral range.

Moreover, it is possible to use a pilot beam in the visible or infrared spectral range in order to allow the detection system to capture and display scattered radiation arising at the floater.

According to a further example configuration, the difference in the wavelengths of OCDR and laser systems is less than 50 nm, for example less than 5 nm, so that common beam guidance and focusing elements can be used in the therapy device, but also so that the refraction of the light of both systems into the eye by way of corneal and lens refraction do not substantially differ from one another.

Furthermore, it is advantageous according to the invention if the arrangement comprises an additional fixation mark for the patient, in order to achieve advantageous or deliberate positioning of the patient's eye.

Moreover, a changeable fixation mark for the patient offers the option of processing while eye movements are stimulated therewith. By way of example, this may also be necessary in order to even bring floaters into the region accessible to processing. Additionally, a moving target mark can prompt the patient to move the eye in order to move floaters into or out of a region. By way of example, the degree of subjective interference by a floater can be checked by virtue of the floater being moved into the central visual range (e.g., in front of the macula), but then being moved into a region less critical to the laser treatment, for example in front of the retinal periphery, and being subject to laser therapy there.

According to a further example configuration, the use of an additional vacuum contact glass for additional fixation of the eye is provided. In this case, an optional vacuum supply and coupling to the therapy laser during the treatment are provided. This is especially helpful for highly precise laser treatment of floaters by application of fs lasers with focal diameters of less than 20 µm, 10 µm or even 5 µm. For the higher lateral resolutions, a pupil dilation and optionally also beam shaping by use of adaptive optics, for example deformable mirrors or else liquid crystal SLMs, are advantageous.

Figure 4:
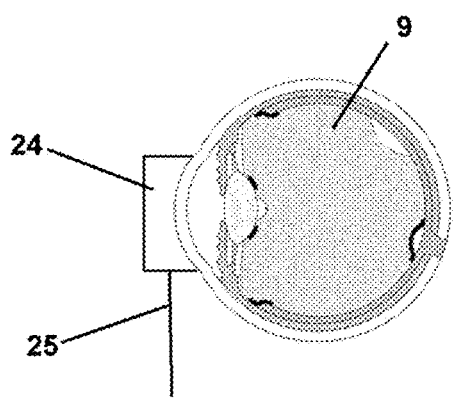
FIG. 4: shows a schematic illustration of an eye with an applied contact glass.

In this case, the contact glass can be equipped with a device for determining the intraocular pressure or its change during the laser treatment. Such a contact glass 24 is depicted in FIG. 4.

The generation of gas bubbles by the effect of the laser pulses may be the cause for the change in the intraocular pressure in this case. The eye could be damaged if these exceed a certain level. By way of a control line 25, the measured intraocular pressure is transmitted to the control unit 6 (not shown here), which for example interrupts the further laser treatment should an intraocular pressure difference of for example 2, 5 or 10 mmHg be exceeded. Basics for determining the intraocular pressure using a contact glass are presented, for example, in Leonardi et al.; First Steps toward Noninvasive Intraocular Pressure Monitoring with a Sensing Contact Lens. Invest. Ophthalmol. Vis. Sci. 2004; 45(9):3113-3117. doi: 10.1167/iovs.04-0015.

The solution according to the invention provides an arrangement for OCDR-assisted laser treatment of vitreous humor opacification, which rectifies the disadvantages of the known technical solutions.

The arrangement facilitates a simpler, quicker and especially safer treatment of bothersome vitreous humor opacification by way of laser vitreolysis. Moreover, the solution can easily be implemented and is economically cost-effective.

The present invention relates to an arrangement provided for sparing, low-risk laser treatment of vitreous humor opacification which is almost painless. A partly or completely automated therapy device (system) is proposed, in which an OCDR system is used for navigation purposes in order to locate the floaters within the scope of the treatment and in order to assist the treatment thereby.

The proposed arrangements also facilitate the safer treatment of hard to recognize, largely transparent floaters that change their position, with the effort for positioning the treatment laser beam being able to be reduced and a visible target laser beam no longer being mandatory.

The risk of retinal damage as a result of incorrect focal positions or a distance between laser focus and sensitive structures of the eye that is too small could be removed by the determination of exclusion criteria for the treatment.

Moreover, the risk of retinal damage in the case of incomplete vitreous humor detachment as a result of a local increase of the pull on the retina could be reduced by virtue of the treatment being adapted or terminated on account of derived abort criteria.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A laser vitreolysis arrangement for an eye, comprising:
an Optical Coherence Domain Reflectometry (OCDR) system;
a laser system with a deflection unit;
optical elements that couple the OCDR system and the laser system;
a display unit and a central control and operating unit;
the OCDR system being configured to locate floaters;
the laser system being configured to destroy the floaters by application of laser pulses; and
the central control and operating unit being configured to activate the laser system on a basis of a fixed position of a floater or the floaters in relation to a focal position of the laser system and in relation to eye structures; and
wherein the central control and operating unit is further configured to determine changes indicative of adverse effects to the eye in a structure of the eye proximate the floater located during treatment and to derive exclusion criteria for the treatment based on the determined changes in the structure of the eye.

2. The arrangement as claimed in claim 1, further wherein the central control and operating unit is configured to automatically trigger the laser system within a time period of <10 ms following the detection of the floater, taking account of the exclusion criteria derived for the treatment and application-specific irradiation patterns which were generated or are to be selected.

3. The arrangement as claimed in claim 1, wherein the OCDR system, the laser system with the deflection unit, the optical elements that couple the OCDR and the laser system, the display unit and the central control and operating unit are integrated in a slit lamp biomicroscope or in a surgical microscope.

4. The arrangement as claimed in claim 2, wherein the OCDR system, the laser system with the deflection unit, the optical elements that couple the OCDR and the laser system, the display unit and the central control and operating unit are integrated in a slit lamp biomicroscope or in a surgical microscope.

5. The arrangement as claimed in claim 1, wherein the OCDR system operates based on a spectral domain method or a swept source method.

6. The arrangement as claimed in claim 1, wherein the laser system is comprises a us-laser, an ns-laser, a ps-laser, an fs-laser or combinations thereof.

7. The arrangement as claimed in claim 1, wherein a difference in wavelengths of the OCDR system and the laser system is less than 50 nm.

8. The arrangement as claimed in claim 1, wherein the OCDR system has a greater axial resolution than a smallest Rayleigh length of the laser system utilized.

9. The arrangement as claimed in claim 1, wherein in terms of distances from eye structures, the central control and operating unit is configured such that an operator can define or alter a processing region within which laser processing is activatable.

10. The arrangement as claimed in claim 1, wherein the central control and operating unit is configured to select or enable selection of laser parameters selected from a group consisting of laser energy, laser focus shift in relation to OCDR, laser wavelength and laser pulse number,
wherein the parameters are varied depending on the focal position of the laser system, depending on the distance of the localized floaters from eye structures, or both, and
wherein the focal position of the laser system is altered by way of a common focusing unit.

11. The arrangement as claimed in claim 1, wherein the OCDR system has a smaller numerical aperture in comparison with the laser system.

12. The arrangement as claimed in claim 1, further wherein the central control and operating unit is configured to derive abort criteria for the treatment and a decision to abort or continue is derived during the treatment based on the changes in the structure of the eye.

13. A laser vitreolysis arrangement for an eye, comprising:
an Optical Coherence Domain Reflectometry (OCDR) system;
a laser system with a deflection unit;
optical elements that couple the OCDR system and the laser system;
a display unit and a central control and operating unit;
the OCDR system being configured to locate floaters;
the laser system being configured to destroy the floaters by application of laser pulses; and
the central control and operating unit being configured to activate the laser system on a basis of a fixed position of a floater or the floaters in relation to a focal position of the laser system and in relation to eye structures;
wherein the central control and operating unit is further configured to determine changes in a structure of the eye closest to the floater located during treatment and to derive exclusion criteria for the treatment;
wherein the central control and operating unit is further configured to automatically trigger the laser system within a time period of <10 ms following the detection of the floater, taking account of the exclusion criteria derived for the treatment and application-specific irradiation patterns which were generated or are to be selected.

14. The arrangement as claimed in claim 13, wherein the OCDR system, the laser system with the deflection unit, the optical elements that couple the OCDR and the laser system, the display unit and the central control and operating unit are integrated in a slit lamp biomicroscope or in a surgical microscope.

* * * * *